(12) United States Patent
Pompea et al.

(10) Patent No.: US 10,851,755 B2
(45) Date of Patent: Dec. 1, 2020

(54) VEHICLE OPERATION ADJUSTMENT USING INTERNAL AND EXTERNAL DATA

(71) Applicants: Bosch Automotive Service Solutions, Inc., Warren, MI (US); Robert Bosch GmbH, Stuttgart (DE)

(72) Inventors: Ralph Pompea, Davisburg, MI (US); Jeremy Hargis, Novi, MI (US)

(73) Assignees: Bosch Automotive Service Solutions, Inc, Warren, MI (US); Robert Bosch GmbH, Stuttgart (DE)

( * ) Notice: Subject to any disclaimer, the term of this patent is extended or adjusted under 35 U.S.C. 154(b) by 64 days.

(21) Appl. No.: 16/191,105

(22) Filed: Nov. 14, 2018

(65) Prior Publication Data

US 2019/0162154 A1  May 30, 2019

Related U.S. Application Data

(60) Provisional application No. 62/592,779, filed on Nov. 30, 2017.

(51) Int. Cl.
| | | |
|---|---|---|
| *F02N 11/10* | (2006.01) | |
| *H04L 29/08* | (2006.01) | |
| *G06Q 20/08* | (2012.01) | |
| *G07C 5/00* | (2006.01) | |
| *F02D 35/00* | (2006.01) | |
| *H04W 4/48* | (2018.01) | |
| *B60W 20/16* | (2016.01) | |
| *B60W 20/12* | (2016.01) | |

(52) U.S. Cl.
CPC .......... *F02N 11/101* (2013.01); *B60W 20/12* (2016.01); *B60W 20/16* (2016.01); *F02D 35/0007* (2013.01); *G06Q 20/085* (2013.01); *G07C 5/008* (2013.01); *H04L 67/12* (2013.01); *H04W 4/48* (2018.02)

(58) Field of Classification Search
CPC .............. F02N 11/101; F02N 11/0803; F02N 2300/306; F02N 2200/123; F02N 2200/106; F02N 2200/12; B60W 20/16; B60W 20/12; B60W 2555/60; B60W 2556/50; B60W 20/20; H04L 67/12; G06Q 20/085; G06Q 20/3223; G07C 5/008; G07C 2209/04; G07C 2205/02; F02D 35/0007; H04W 4/48
See application file for complete search history.

(56) References Cited

U.S. PATENT DOCUMENTS

| 6,370,475 B1 | 4/2002 | Breed et al. |
| 6,647,328 B2 | 11/2003 | Walker |
| (Continued) | | |

FOREIGN PATENT DOCUMENTS

| DE | 10201002579 | 1/2012 |
| GB | 2390438 | 1/2014 |
| (Continued) | | |

*Primary Examiner* — Xiao En Mo
(74) *Attorney, Agent, or Firm* — David Kovacek; Maginot, Moore & Beck LLP (57) ABSTRACT

A system and method for controlling the operations of a vehicle in response to an analysis of the vehicle's status and performance compared to a set of external performance parameters. The vehicle may be operable to adjust its performance in response to the analysis in order to comply with the performance parameters. The vehicle may further be operable to prevent activation or continued operation of one or more components in response to the analysis.

20 Claims, 5 Drawing Sheets

(56) References Cited

U.S. PATENT DOCUMENTS

| | | |
|---|---|---|
| 7,062,371 B2 | 6/2006 | Gault et al. |
| 7,579,964 B2 | 8/2009 | Nath et al. |
| 7,974,774 B2 | 7/2011 | Kumar |
| 8,229,693 B2 | 7/2012 | Willard et al. |
| 9,129,459 B2 | 9/2015 | Tesanovic et al. |
| 2005/0173523 A1 | 8/2005 | Yushio et al. |
| 2008/0154671 A1 | 6/2008 | Delk |
| 2017/0168487 A1 | 6/2017 | Mantripragada et al. |
| 2017/0186313 A1 | 6/2017 | Stein |
| 2018/0082225 A1 | 3/2018 | Nacey |

FOREIGN PATENT DOCUMENTS

| | | |
|---|---|---|
| WO | 2016118055 | 7/2016 |
| WO | 2017149281 | 9/2017 |

VEHICLE OPERATION ADJUSTMENT USING INTERNAL AND EXTERNAL DATA

TECHNICAL FIELD

This disclosure relates to vehicle performance optimization.

BACKGROUND

Vehicles have telematics systems, infotainment systems, driver-assistance systems, and are now employing some autonomous features, some of which may provide safety and navigation features to drivers and passengers. A number of sensors are located throughout the vehicle and provide data to these systems, which the systems in turn utilize to enhance safety and navigation of the vehicle. External systems also produce data that is readily available from the environment via radio waves or the internet, such as local temperatures, wind speed, wind direction, and smog levels, to name a few.

What is needed is a vehicle system that utilizes data generated within the vehicle and data generated external of the vehicle to ensure a vehicle remains compliant with safety laws and legal regulations, such as emissions restrictions.

SUMMARY

One aspect of this disclosure is directed to a vehicle control system configured to interface with a number of sensors and a number of electronic control units of a vehicle the vehicle control system being operable to adjust the functions and operation of the vehicle to comply with an external report of driving regulations. The vehicle control system may be embodied at least in part using a dongle configured to interface with a diagnostic port of the vehicle.

Another aspect of this disclosure is directed to a vehicle control system is operable to control the ignition of an engine of the vehicle based upon external data providing emissions regulation requirements. The vehicle control system may comprise a user interface provided using a mobile device such as a smart phone or diagnostic tablet computer.

In a further aspect of this disclosure, a vehicle control system is operable to over-ride an operational adjustment of the vehicle in response to a special condition, such as payment of an operations fee or indication of an emergency.

A further aspect of this disclosure is directed to a method of controlling the functions of a vehicle in order to ensure compliance with regulation requirements provided by an external source. In some embodiments, function control includes prevention of activation of a particular function.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
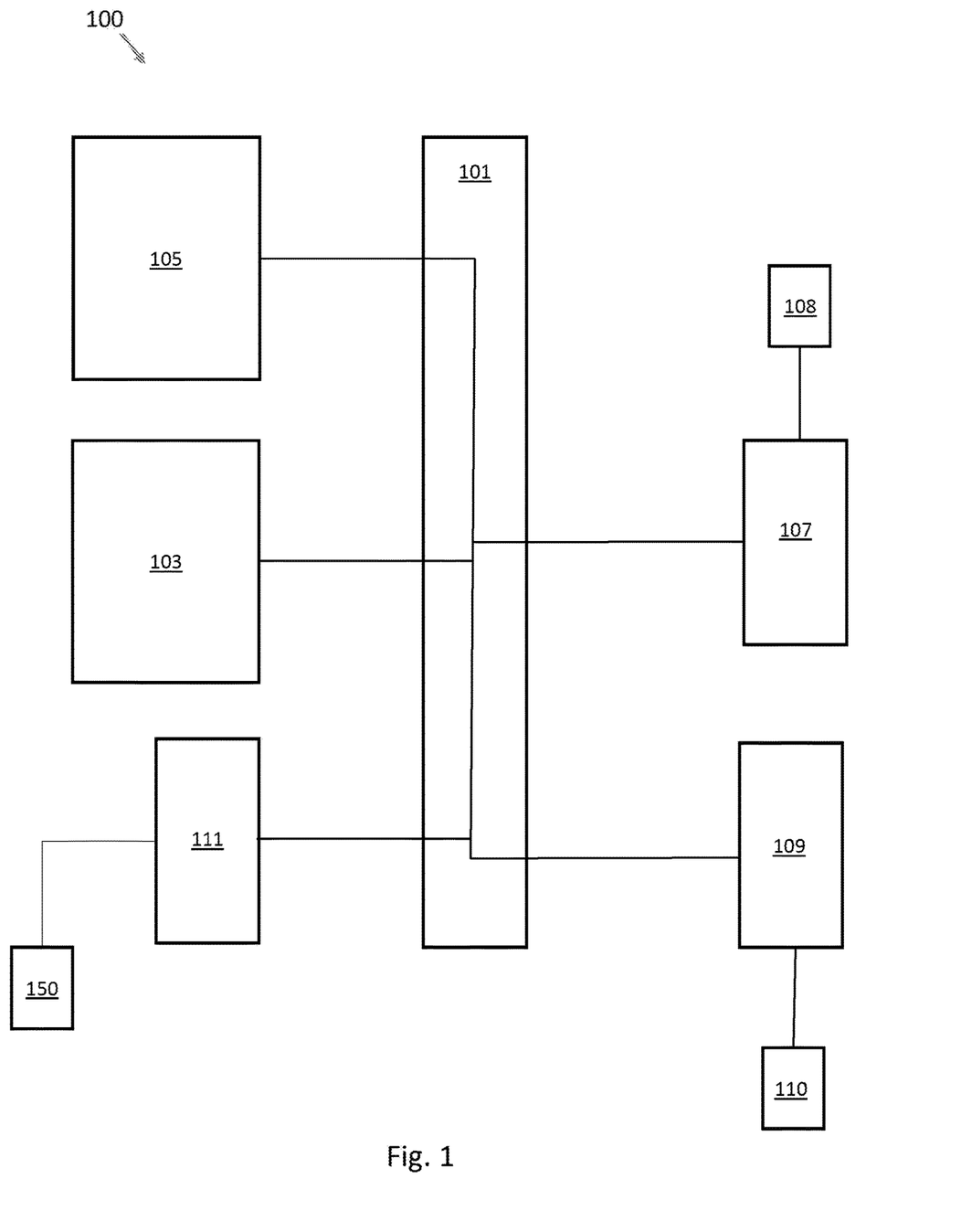
FIG. 1 is a diagrammatic view of a vehicle control system.

FIG. 1 shows a diagrammatic view of a vehicle control system 100 according to one embodiment of the teachings disclosed herein. A communication grid 101 forms the basis of communication between other elements of the vehicle control system 100. In some embodiments, communication grid 101 may comprise electric wiring, conductive channels, electrical buses, fiber optic pathways, optical pathways, data buses of a processor, automotive buses, a Controller Area Network (CAN) bus, or any other alternative configuration known to one of ordinary skill in the art. In data communication with communication grid 101 is a coordinating processor 103, a memory 105, a sensor interface 107 a vehicle-activity interface 109, and a network interface 111. Coordinating processor 103 controls the operation of the other components of vehicle control system 100. In the depicted embodiment, coordinating processor 103 is embodied as a single processor unit, but other embodiments may comprise other configurations such as a distributed network of processors, an external processor, an embedded control device, specialized processing components embedded in each of the other components, a processor embodied within a vehicle head unit, or any other alternative configuration known to one of ordinary skill in the art. Memory 105 provides a data store for the other components of vehicle control system 100. In some embodiments, memory 105 may provide instructions for the functions of coordinating processor 103. In the depicted embodiment, memory 105 comprises a random-access data store, but other embodiments may comprise other arrangements such as a ROM, EPROM, flash memory, hard disk drive, removable magnetic storage, or any other alternative embodiment known to one of ordinary skill.

Coordinating processor 103 is in communication with a sensor interface 107 via communication grid 101. Sensor interface 107 is operable to provide a data exchange between the communication grid 101 and a number of sensors 108. The data exchange of sensor interface 107 between sensors 108 and communication grid 101 is operable to exchange measurement data of the number of sensors 108 with other components of the vehicle control system 100, such as the coordination processor 103 or the memory 105. Sensor interface 107 is further operable to permit coordination processor 103 to control sensors 108, such as to request measurement data. Sensors 108 may include any device that is operable to monitor the environmental status surrounding the vehicle, the physical condition of the vehicle, or a functional state of a component of the vehicle. In some embodiments, sensors 108 may comprise a speedometer, tachometer, oxygen-emissions sensor, external temperature sensor, global-positioning system (GPS) location sensors, fuel tank sensor, braking activity sensor, rear proximity sensors, forward proximity sensors, vehicle backup sensors, or any other sensor known to one of ordinary skill in the art. In some embodiments, sensors 108 may include specialized sensors to provide specific functionality to vehicle control system 100, such as carbon-dioxide emissions sensors, radio frequency sensors, radar sensors, stoichiometric sensors, infrared sensors, or the like. Advantageously, vehicle control system 100 may rely upon conventional sensors in combination to determine additional conditions of the vehicle, for example utilizing an oxygen-emissions sensor, tachometer, and fuel tank sensor to enable coordinating processor 103 to estimate carbon dioxide emissions based upon oxygen emissions, engine operation, and fuel consumption. In the depicted embodiment of FIG. 1, sensor 108 represents a plurality of sensors, though some embodiments may only comprise a single sensor in data communication with the rest of vehicle control system 100.

Coordinating processor 103 is in communication with a vehicle-activity interface 109 via communication grid 101. Vehicle-activity interface 109 is operable to provide a data exchange between the communication grid 101 and a number of electronic control units 110 of the vehicle. Electronic control units 110 comprise vehicle units or modules that are operable to adjust the operation of vehicle components, and generate vehicle-activity data pertaining to the status or condition of vehicle components. Vehicle-activity data may comprise component status data, diagnostic test codes, error messages, or any other data that may be generated by an electronic control unit. In some embodiments, electronic control units 110 may comprise a braking control unit, a steering control unit, a navigation control unit, an engine control unit (sometimes alternatively called an "engine control module"), a transmission control unit, a motor control unit, or any other such unit or module that is operable to adjust the operation of other vehicle components. Coordinating processor 103 may be operable to control functions of the vehicle by sending commands to electronic control units 110 via vehicle-activity interface 109. In some embodiments, electronic control units 110 may be in data communication with one or more of sensors 108 (communication channel not shown). In some embodiments, electronic control units 110 may comprise dedicated sensors. In some embodiments wherein electronic control units 110 are in data communication with a sensor, one or more of the electronic control units 110 may be operable to report data from the sensors to communication grid 101. By way of example, and not limitation, an engine control unit may be operable to utilize sensors and diagnostic analysis to monitor whether the engine is operating in a closed-loop or open-loop mode, and coordinating processor 103 may utilize the corresponding vehicle-activity data to determine that emissions are high if the vehicle remains in an open-loop mode for longer than an expected length of time during operation (e.g., 15 minutes during initial operation). In the depicted embodiment of FIG. 1, electronic control unit 110 represents a plurality of electronic control units, though some embodiments may only comprise a single electronic control unit in data communication with the rest of vehicle control system 100.

Coordinating processor 103 is in communication with a network interface 111 via communication grid 101. Network interface 111 is operable to provide a data exchange between vehicle control system 100 and an external device 150. External device 150 may comprise a processor, network server, distributed network of processors, external vehicle control system, any combination of the previously listed embodiments, or any other alternative configuration known to one of ordinary skill in the art. External device 150 is operable to provide vehicle control system 100 with network data useful to operation of the vehicle control system. For example, network data may include navigational data, traffic conditions data, pollution conditions data, legal restrictions data, or any other data that may be provided by an external source. Network interface 111 is depicted as a single component of vehicle control system 100, operable for two-way communication between external device 150 and communication grid 101. In some embodiments, network interface 111 may comprise separate transmitter and receiver components, each such component providing one-way communication between vehicle control system 100 and external device 150.

Coordinating processor 103 may be operable to utilize the network data in comparison with the sensor data or vehicle-activity data to optimize the operation of the vehicle. By way of example, and not limitation, an embodiment of external device 150 may provide network data in the form local legal restrictions of vehicle operation. For example, to compensate for poor air quality, local municipalities (e.g., a city, county, state or any other location subject to a common governing authority) may declare temporary "air quality warnings" which are in effect within the bounds of the municipality that require limited vehicular emissions. External device 150 may collate a current list of municipalities under temporary air quality warnings, or "warning zones," along with data corresponding to the bounds of the warning zones and the restrictions of the warning zones as network data. External device 150 may then provide the network data to vehicle control system 100, where the data may be stored in memory 105. Coordinating processor 103 may then utilize the stored network data in comparison to navigational data obtained using sensors 108 to monitor whether the vehicle is currently operating within the bounds of a municipality subject to an air quality warning. If the vehicle is outside the bounds of warning zone, no further action is required of vehicle control system 100. If the vehicle is operating within a warning zone, coordinating processor 103 may then analyze sensor data provided by sensor interface 107, vehicle-activity data provided by vehicle-activity interface 109, or both sets of data to determine whether the vehicle is operating within the parameters required by the network data. If the vehicle is operating within the parameters of the restrictions of the warning zone, then nothing further is required of vehicle control system 100. If the vehicle is not operating within the parameters of the restrictions of the warning zone, coordinating processor 103 may then send commands to the vehicle-activity interface 109 to adjust the operation of the vehicle via electronic control units 110 based to conform to the restrictions, based upon predictions in how the vehicle will change with respect to the restrictions in response to the operational adjustments. For example, if the vehicle is determined to be emitting pollutants at a rate beyond what is accepted by the warning zone restrictions, coordinating processor 103 may send commands to the electronic control units 110 via vehicle-activity interface 109 to adjust the operation of the vehicle's engine. In some embodiments, this may include such commands as placing a floor value or ceiling value on the vehicle's velocity, stoichiometry, or tachometry to optimize emissions. In some embodiments having a vehicle comprising hybrid combustion engine/electric motor, the combustion engine may be disabled and the vehicle may operate in a purely-electric mode. In some embodiments, such as an embodiment comprising an autonomous vehicle, coordinating processor 103 may determine that the vehicle is incapable of conforming to the emissions requirements, and send commands operable to navigate the vehicle away from the warning zone or to safely deactivate the vehicle. In some embodiments, coordinating processor 103 may be operable for a human user (such as a passenger of the vehicle) to provide an over-ride command to negate the adjustments or deactivation of vehicle functions. An over-ride may be made available to a human user in emergency situations, in response to changing of vehicle operation conditions (e.g., adding enough additional passengers to qualify for high-occupancy vehicle status), in response to payment of a fee, or any other similar reasons known to one of ordinary skill. These embodiments are presented by way of example and not limitation, and one of ordinary skill in the art will recognize other embodiments of adjusting vehicle operation without deviating from the teachings disclosed herein.

In some embodiments, external device 150 may be configured to transmit network data to vehicle system 100 at scheduled intervals of time. In some embodiments, coordinating processor 103 may request the network data from external device 150 at regular intervals. In some embodiments, coordinating processor 103 may request network data from external device 150 upon a significant operational event such as activation of the vehicle, entrance into a different municipality, request from a passenger of the vehicle, a change in the operational status of one or more vehicle components, or having traveled a distance associated with routine maintenance of the vehicle. Other embodiments may comprise other significant operational events recognized by one of ordinary skill without deviating from the teachings disclosed herein.

Figure 2:
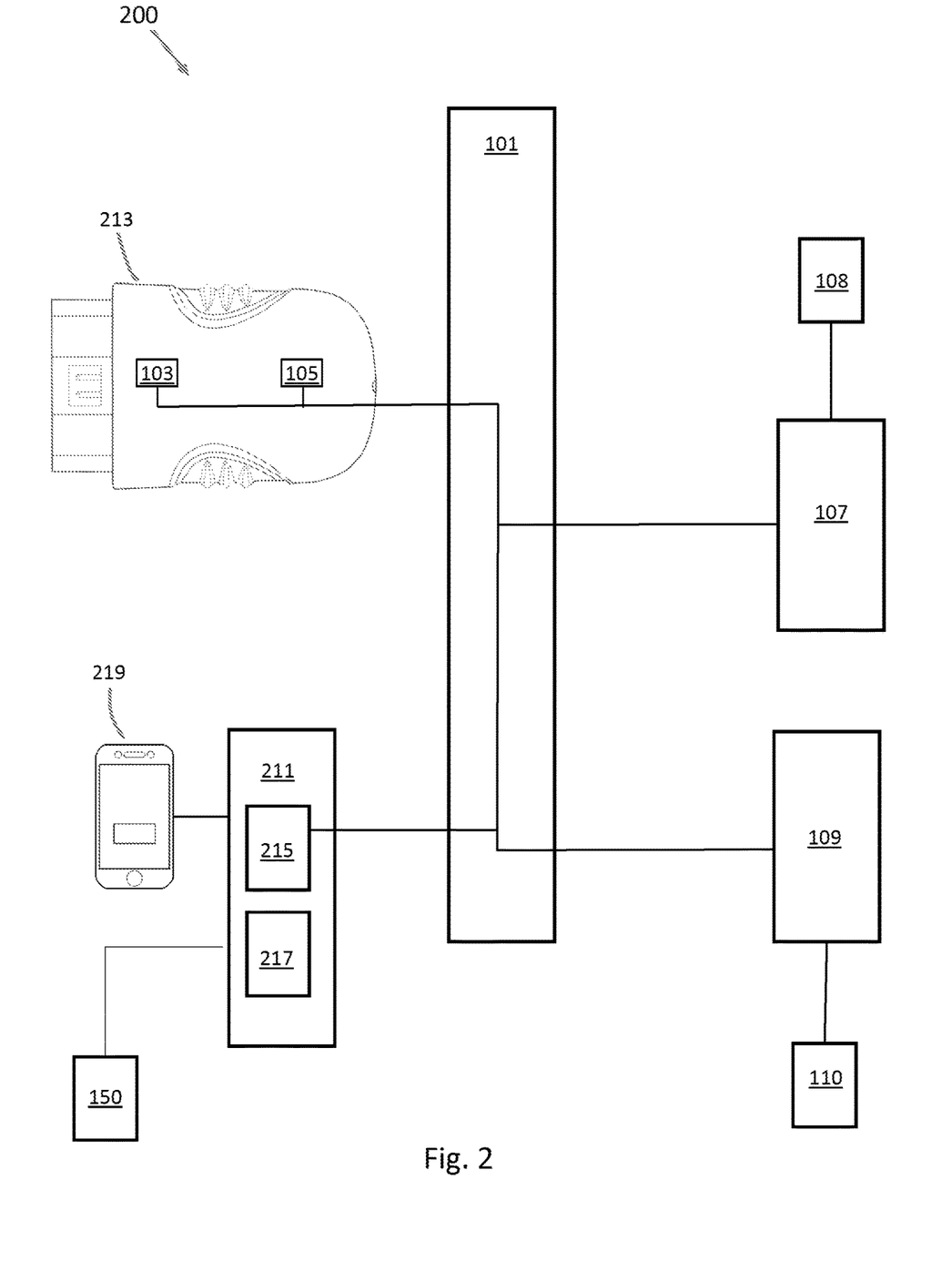
FIG. 2 is a diagrammatic view of a vehicle control system embodied in part using a dongle configured to interface with a vehicle diagnostic port.

FIG. 2 depicts a diagrammatic view of a different embodiment of a vehicle control system 200. Vehicle control system 200 comprises many of the same components as vehicle control system 100. The coordinating processor 103 and memory 105 are functionally unchanged, but are now embodied within a dongle 213 configured to interface with the diagnostic port of the vehicle. Communication grid 101, sensor interface 107, sensors 108, vehicle-activity interface 109, and electronic control units 110 are functionally equivalent and largely unchanged in their arrangement, though in some embodiments some or all of these components may be embodied within dongle 213. Vehicle control system 200 additionally comprises a network interface 211 which is functionally equivalent to the network interface 111 of vehicle control system 100, though network interface 211 is depicted as an embodiment having a distinct transmitter 215 and receiver 217. Vehicle control system 200 further comprises a mobile device 219 in communication with network interface 211. In Mobile device 219 may be operable to provide a human user interface to permit a driver or passenger of the vehicle to monitor the data generated by sensors 108 or electronic control units 110, to monitor the data stored in memory 105, monitor the network data transmitted by external device 150, provide a human user interface to control the functions of the vehicle via coordinating processor 103 or vehicle-activity interface 109, or acquire diagnostic data from sensors 108 or electronic control units 110. In the depicted embodiment, mobile device 219 is embodied as a smart phone, but other embodiments may comprise other configurations such as a diagnostic tablet processor, portable computing device, a vehicle head unit, a personal computer, or any other equivalent configuration recognized by one of ordinary skill. In the depicted embodiment, mobile device 219 is in wireless communication with network interface 211, but other embodiments may comprise other connections. In some embodiments, mobile device 219 may be in wireless communication with external device 150. In some embodiments, mobile device 219 may provide additional data to vehicle control system 200, such as navigational data, traffic conditions data, pollution conditions data, legal restrictions data, or any other data that may be provided by an external source. In some embodiments, mobile device 219 may comprise or replace external device 150 as a source of network data for vehicle control system 200.

Figure 3:
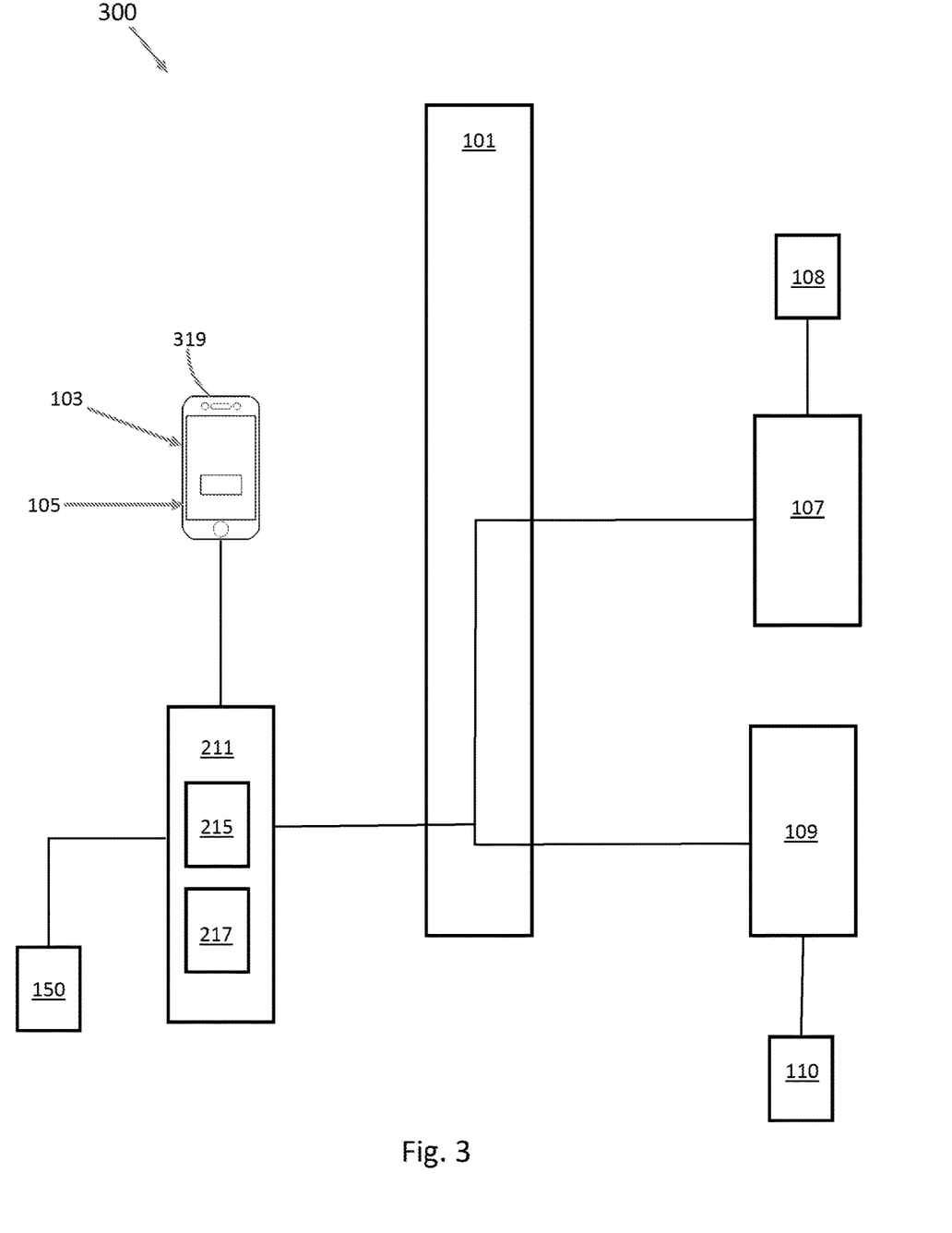
FIG. 3 is a diagrammatic view of a vehicle control system embodied in part using a mobile device.

FIG. 3 depicts a diagrammatic view of a different embodiment of a vehicle control system 300. Vehicle control system 300 comprises many of the same components as vehicle control system 100. The coordinating processor 103 and memory 105 are functionally unchanged, but are now embodied within a mobile device 319. In the Communication grid 101, sensor interface 107, sensors 108, vehicle-activity interface 109, and electronic control units 110 are functionally equivalent and largely unchanged in their arrangement, though in some embodiments some or all of these components may be embodied within mobile device 319. Network interface 211, having transmitter 215 and receiver 217, is functionally equivalent to its description with respect to FIG. 2. In the depicted embodiment, mobile device 219 is embodied as a smart phone, but other embodiments may comprise other configurations such as a diagnostic tablet processor, portable computing device, a vehicle head unit, a personal computer, or any other equivalent configuration recognized by one of ordinary skill. In the depicted embodiment, mobile device 219 is in wireless communication with network interface 211, but other embodiments may comprise other connections. In some embodiments, mobile device 219 may be in wireless communication with external device 150. In some embodiments, mobile device 219 may provide additional data to vehicle control system 200, such as navigational data, traffic conditions data, pollution conditions data, legal restrictions data, or any other data that may be provided by an external source. In some embodiments, mobile device 219 may comprise or replace external device 150 as a source of network data for vehicle control system 200.

Mobile device 219 may further be operable to provide functionality directed to over-ride commands of vehicle control system 300. For example, if coordination processor 103 analyzes the sensor data, vehicle-activity data, network data, or additional data to yield a result indicating a need for adjustment of vehicle operation, mobile device 219 may be operable to present an indication of such to a human user, such as a passenger of the vehicle. In some embodiments, mobile device 219 may accompany the indication with additional user dialog options to address the status change if desired. For example, in one embodiment, if coordination processor 103 determines multiple adjustments would satisfy the restrictions of the network data, mobile device 219 may present a user dialog presenting each option to a human user for selection. If no selection is made, a default option may be utilized to adjust the vehicle operation parameters.

In another embodiment, mobile device 219 may provide an over-ride dialog to allow the user to optionally prevent the operational adjustments to the vehicle. For example, mobile device 219 may comprise a dialog component permitting the user to indicate the need for vehicle operation in an emergency. In another example, the operation of the vehicle may be adjusted in response to changing conditions of the vehicle, such as an addition of passengers that qualifies the vehicle to operate as a high-occupancy vehicle. In another example, mobile device 219 may permit the user to over-ride the vehicle operation adjustment in response to payment of a fee. In such an embodiment, mobile device 219 may further be operable to initiate a transfer of funds from a bank account to accommodate the fee payments. In some embodiments, a combination of these options or other unspecified options may be available via mobile device 219, and the options available may depend upon local laws within the current municipality of the vehicle, or of mobile device 219.

Figure 4:
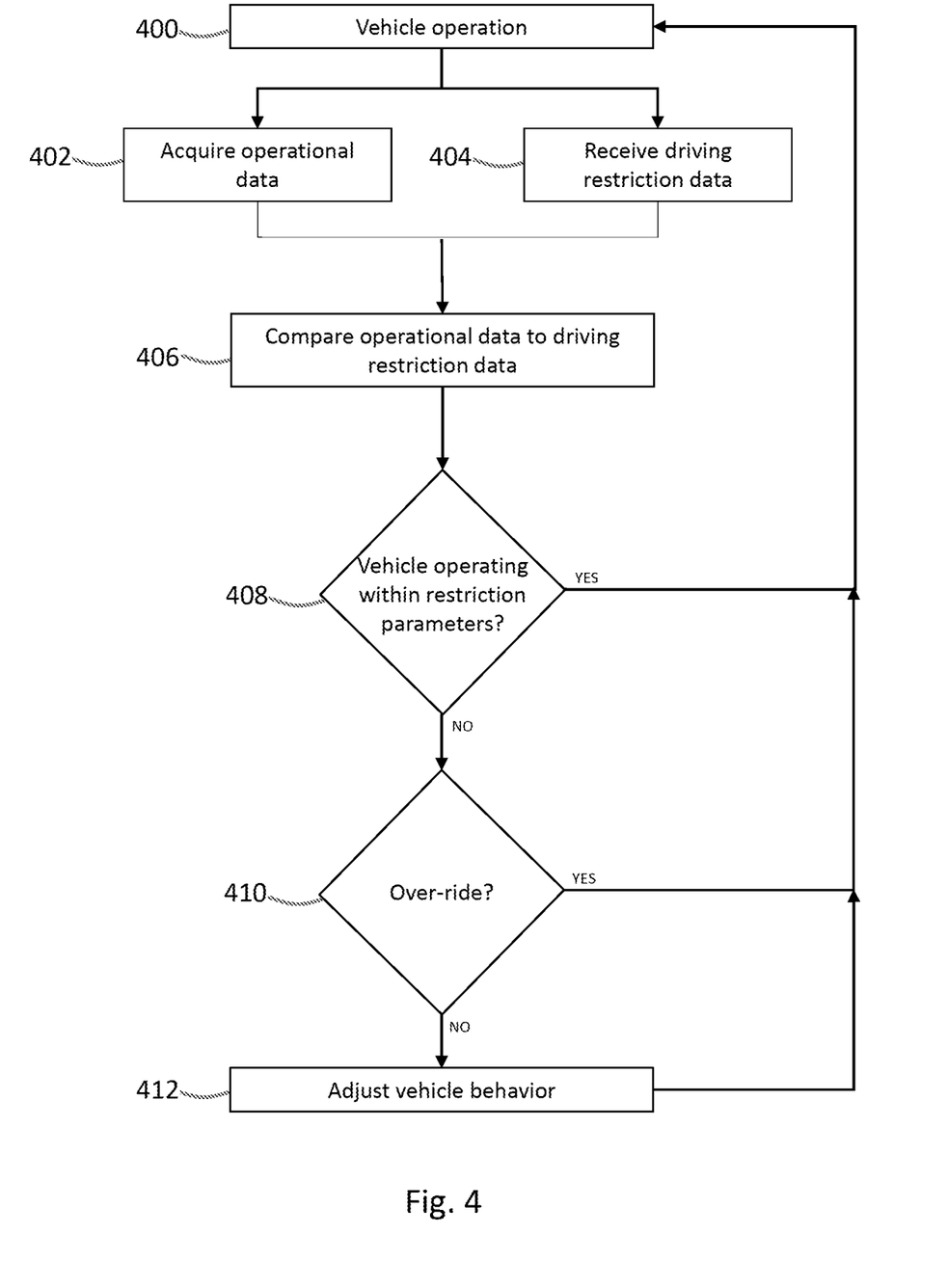
FIG. 4 is a flow chart illustrating a method of vehicle function control.

FIG. 4 depicts the steps of a method for controlling the operation of a vehicle using a vehicle control system as disclosed in the teachings herein. The method begins during vehicle operation at step 400, though other embodiments may begin prior to activation of the vehicle. At step 402, operational data pertaining to the vehicle is acquired. The operational data may comprise sensor data from one or more sensors of the vehicle and vehicle-activity data from one or more electronic control units of the vehicle. The operational data may provide indications of the behavior of the vehicle, the status of the vehicle and its components, environmental data, or any other information useful to determine the operational state of the vehicle. At step 404, driving restriction data is received from an external source. Driving restriction data may include legal restriction data, such as speed limits, emission limits, occupancy limits, or the like. Driving restriction data may include location-specific restrictions that are paired with zones of enforcement. Driving restriction data may include restrictions that are only applicable when compared to operational data or vehicle identity information, such as requirements for vehicles to obtain regular safety inspections, to maintain active registrations, or comply with temporary emissions requirements. Driving restriction data may be supplied by a network server, an online resource, a municipality-sponsored advisory system, or some combination of these or any other data source known to one of ordinary skill. Driving restriction data may be acquired from a network interface of a vehicle, an aftermarket device providing online connectivity to a vehicle, a mobile device such as a smart phone, or any other equivalent device known to one of ordinary skill. In the depicted embodiment, steps 402 and 404 are performed substantially concurrently, but other embodiments may have other arrangements. Step 402 may be performed prior to step 404, or vice-versa, without deviating from the teachings disclosed herein. In some embodiments, step 404 may be performed prior to step 400, such as upon activation of the vehicle.

After the completion of steps 402 and 404, the operational data is next compared to the driving restriction data at step 406. The comparison may require an analysis of the operational data to compliance of the vehicle with the driving restriction data. For example, a vehicle without carbon dioxide sensors may utilize an analysis of oxygen sensor data and fuel consumption data to estimate carbon dioxide emissions. The comparison at step 406 determines whether the operational data indicates that the vehicle is operating within the parameters required by the driving restriction data and proceeds to the decision at step 408. At step 408, if the vehicle is operating within the parameters required by the driving restriction data, no further action is required and the method returns to step 400. In some embodiments, step 408 may determine if the vehicle is operating within the restriction requirements with optimal operational efficiency. For example, if the vehicle is operating at a sub-optimal efficiency and would still be operating within restriction parameters at a greater efficiency, the adjustment may be made to improve the vehicle's efficiency. If the vehicle is not operating within the parameters required by the driving restriction data, the method continues to step 410, where an over-ride decision is made with regard to the adjustment of vehicle operation. The over-ride decision may be based upon a special status of the vehicle, a user input, or a special condition such as an emergency. For example, a user may be given the option to access the over-ride of the adjustment in exchange for payment of a fee. In some embodiments, an over-ride may be optional, and step 410 may be skipped in situations wherein it is not pertinent. In some embodiments, an over-ride may not be considered, and such embodiments will not comprise step 410. If an over-ride is entered at step 410, no further action is required and the method returns to step 400. Otherwise, the method proceeds to step 412 to adjust the vehicle behavior to conform to the driving restriction data. After adjusting the vehicle behavior, the method returns to step 400 until it is next initiated.

In one exemplary embodiment of the method of FIG. 4, a hybrid vehicle having a coordinated prime mover comprising a combustion engine component and an electric motor component may be operating using primarily the combustion engine at step 400. A prime mover, as used here, may be a combustion engine, an electric motor, a combination of the two such as that of a hybrid vehicle, a number of motors, or vehicle propulsion through use of hydrogen fuels cells, gasoline, diesel, electricity, or any other known propulsion systems, or combinations thereof, for vehicles. Sensors may acquire emissions data, stoichiometric data, fuel consumption data or other data related to pollution emissions at step 402. Sensors may additionally track navigational data or location data of the vehicle in step 402. At step 404, the vehicle receives a set of pollution restriction data corresponding to emissions requirements for local municipalities. At step 406, the pollution emissions data is compared to pollution restriction data for the vehicle's current location to determine if an adjustment is required at step 408. If the vehicle is emitting too many pollutants for its current local municipality, the vehicle is operable to adjust the operation of its coordinated prime mover such that it relies less upon the combustion engine component and more on the electric motor component to reduce emissions. Such an adjustment may reduce emissions, but will result in less efficient locomotion or suboptimal performance of the vehicle.

In response to determining that the vehicle is emitting too many pollutants, the vehicle may prompt a user at step 410 whether the user wishes to pay a fee in exchange for an over-ride of the adjustment. If the user initiates and successfully pays the fee, the vehicle operation remains unchanged. Otherwise, the coordinated prime mover adjusts operation at step 412 by reducing its dependence upon the combustion engine and increasing its dependence upon the electric motor. After the adjustment is complete, and the vehicle is operating within the parameters of pollution restriction data, the vehicle resumes operation at step 400. This example is provided as one of many possible interpretations of the method depicted in FIG. 4 and is intended to be illustrative and not limiting in scope.

The method of FIG. 4 may be initiated at regular timed intervals, or in response to a predetermined event. Predetermined events may comprise activation of the vehicle's prime mover, travel exceeding a threshold mileage, a change in occupancy or cargo weight of the vehicle, movement that crosses the boundary of municipalities, user request, report of a diagnostic test code from one or more electronic control units, or any other significant event useful in determining vehicle behavior recognized by one of ordinary skill.

Figure 5:
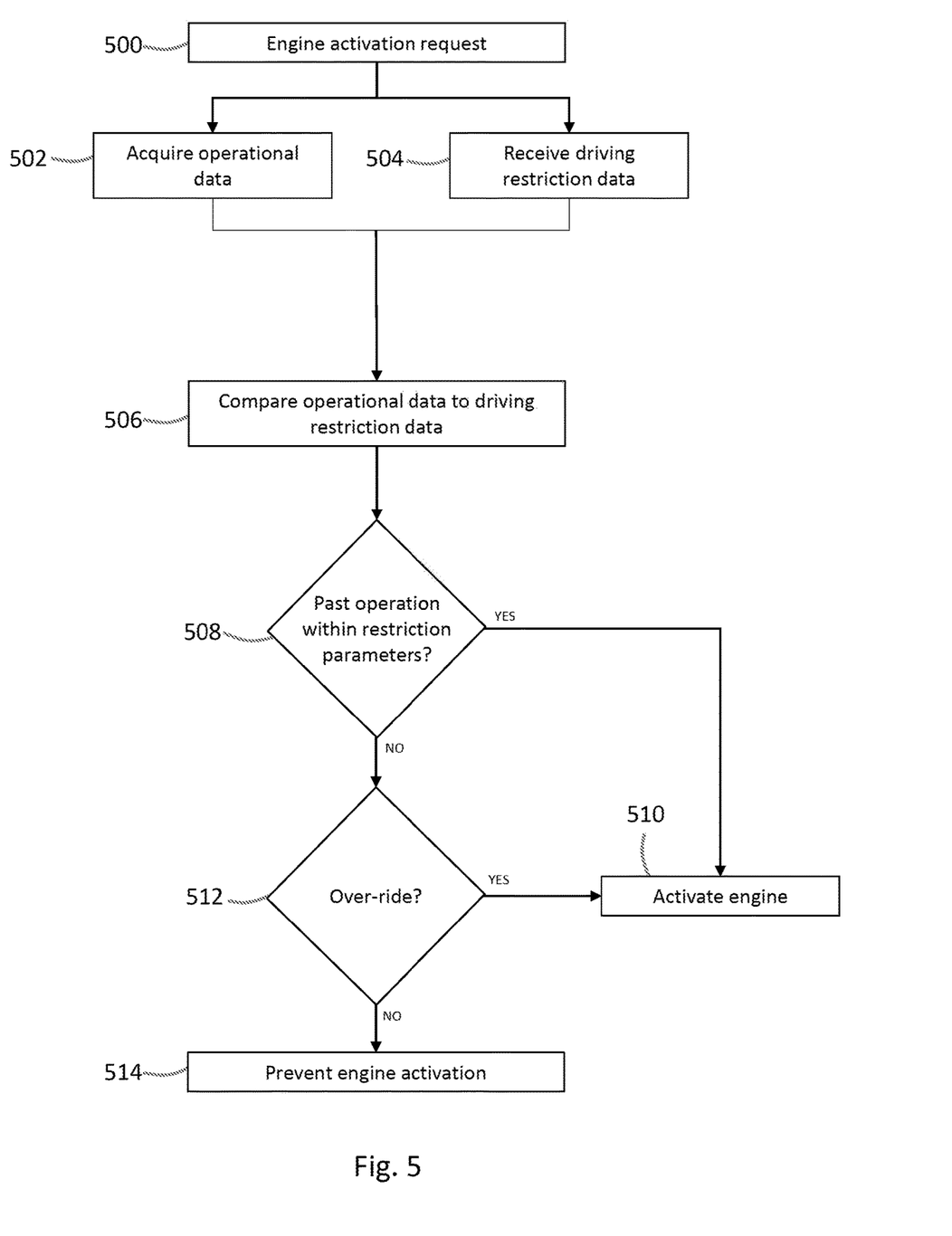
FIG. 5 is a flowchart illustrating a method of engine activation control.

FIG. 5 depicts the steps of a method of controlling the operations of a vehicle using a vehicle control system according to another embodiment of the teachings disclosed herein. In the depicted embodiment, the method is directed to a vehicle having a combustion engine that is not yet in an active operation, and thus begins at step 500 with the engine activation request. The vehicle activation request of step 500 may comprise an electronic vehicle activation command, a key-on operation, an engine ignition, or any other activation of the vehicle. In some alternative embodiments, step 500 may be directed to the activation of a particular component or system of components of the vehicle rather than the vehicle as a whole. The description of FIG. 5 herein is provided by way of example and not limitation, and one of ordinary skill in the art will recognize other embodiments of the teachings disclosed herein.

After the engine activation request, operational data of the vehicle is acquired at step 502. Because the vehicle is not in active operation, the operational data is acquired from a memory storing sensor data and vehicle-activity data measured during past operation of the vehicle. At step 504, driving restriction data is received from an external source. Driving restriction data may include legal restriction data, such as speed limits, emission limits, occupancy limits, or the like. Driving restriction data may include location-specific restrictions that are paired with zones of enforcement. Driving restriction data may include restrictions that are only applicable when compared to operational data or vehicle identity information, such as requirements for vehicles to obtain regular safety inspections, to maintain active registrations, or comply with temporary emissions requirements. Driving restriction data may be supplied by a network server, an online resource, a municipality-sponsored advisory system, or some combination of these or any other data source known to one of ordinary skill. Driving restriction data may be acquired from a network interface of a vehicle, an aftermarket device providing online connectivity to a vehicle, a mobile device such as a smart phone, or any other equivalent device known to one of ordinary skill. In the depicted embodiment, steps 502 and 504 are performed substantially concurrently, but other embodiments may have other arrangements. Step 502 may be performed prior to step 504, or vice-versa, without deviating from the teachings disclosed herein. In some embodiments, step 504 may be performed prior to step 500.

In the depicted embodiment, the driving restriction data received in step 504 comprises temporary emissions requirements corresponding to local municipalities, and the navigational data providing the boundaries of each municipality. Other embodiments may comprise other data.

At step 506, the acquired operational data is compared to the received driving restriction data, such that it can be determined whether the vehicle in previous operation would have conformed to the temporary emission requirements defined by the driving restriction data for the vehicle's local municipality. At step 508, if the vehicle would have conformed to the emissions requirement, the vehicle's engine may be activated at step 510. If the vehicle would not have conformed to the current temporary emission requirements during its previous operation, the method proceeds instead to step 512 to determine if an over-ride is warranted. In the depicted embodiment, an over-ride is accomplished by providing a user with an option to pay a fee to initiate an over-ride, but other embodiments may have other configurations. In some embodiments, the over-ride may be may available to authorized users providing proof of identification. In some embodiments, the over-ride may be may available only in emergency circumstances. In some embodiments, the over-ride may be an optional or omitted feature of the vehicle. In embodiments without an over-ride function, step 512 may be omitted. If the user does not initiate an over-ride, the activation of the engine is prevented at step 514. Though in the depicted embodiment the engine of the vehicle is prevented from activation, other embodiments may prevent activation of other vehicle components instead. In some embodiments, the prevention of vehicle components may comprise an adjustment of vehicle operation from the expected operation, as depicted with respect to FIG. 4 above.

Utilization of the above systems or methods may be used to ensure compliance of a vehicle with safety laws and legal regulations, such as emissions restrictions. Compliance is achievable by monitoring the status of the vehicle for non-compliant behavior and then modifying the behavior of the vehicle in order to comply with requirements. As shown above, compliance requirements may be additionally available from an external data source, with which the enhanced vehicle is in communication. If non-compliance is likely, the vehicle can provide additional functions to inform the passengers, provide an optional fee payment, or alter the functionality of the vehicle to better fit the compliance requirements.

In the above disclosure, this compliance monitoring and adaptation is advantageous to provide passengers with current status reports regarding compliance with emissions, safety inspections, or other regulated functions of the vehicle. In some embodiments disclosed herein, the vehicle may be monitored using conventional arrangements, rather than relying upon proprietary sensors or monitoring tools. In a further advantage, an enhanced vehicle may be operable to ensure routine compliance with safety and emissions requirements, rather than intermittent authorized inspections. As a result, the enhanced vehicle may provide immediate indication of a need for repair, and is operable to consistently provide a safer and more environmentally-friendly operation.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle control system configured to interface with electronic control units of a vehicle, the vehicle having a number of sensors and a number of electronic control units, the vehicle control system comprising:
   a communication grid;
   a memory in data communication with the communication grid;
   a sensor interface in data communication with the communication grid, the sensor interface operable to generate sensor data based upon the measurements of at least one of the number of sensors;
   a vehicle-activity interface in data communication with the communication grid, the vehicle-activity interface operable to communicate with at least one of the number of electronic control units to generate vehicle-activity data during the operation of the vehicle, the vehicle-activity interface further operable to transmit commands to the at least one of the number of electronic control units, the at least one of the number of electronic control units comprising a prime mover control unit operable to control activation and operation of the vehicle's prime mover;

a network interface in data communication with the communication grid, the network interface operable to receive network data from an external processor; and a coordination processor in data communication with the communication grid, the coordination processor operable to store the sensor data or the vehicle-activity data in the memory during operation of the vehicle, the coordination processor further operable to generate a command instructing at least one of the number of electronic control units to alter the operation of the vehicle in response to at least one of the stored sensor data or the stored vehicle-activity data indicating vehicle operations outside of parameters defined by the network data, wherein the command comprises an instruction for the at least one of the number of electronic control units to alter the operation of the vehicle such that the operation complies with a parameter of an operating restriction defined by the received network data and wherein the at least one of the electronic control units is configured to alter the operation of the vehicle to comply with the operating restriction in response to the command, wherein the operating restriction defines an operating parameter including at least one of velocity, stoichiometry, tachometry, and vehicle emissions.

2. The vehicle control system of claim 1, further comprising a dongle configured to interface with a diagnostic port of the vehicle, wherein the coordination processor is disposed within the dongle, and the dongle provides data communication between the vehicle-activity interface and the coordination processor via the diagnostic port.

3. The vehicle control system of claim 2, wherein the network interface is further operable to provide data communication with a mobile device operable to provide a human user interface for the vehicle control system.

4. The vehicle control system of claim 1, wherein the at least one of the number of sensors comprises a global positioning sensor operable to determine the location of the vehicle.

5. The vehicle control system of claim 1, wherein the at least one of the number of sensors comprises an oxygen emissions sensor operable to generate vehicle emission data.

6. The vehicle control system of claim 5, wherein the operating restriction comprises local driving restriction data based upon vehicle emission requirements.

7. The vehicle control system of claim 6, wherein the coordination processor is operable to generate a non-activation command in response to analysis of the vehicle emission data and the local driving restriction data that indicate that the vehicle emission data is not in compliance with the local driving restriction data, the non-activation command operable to prevent or discontinue active operation of the engine of the vehicle.

8. The vehicle control system of claim 7, wherein the processor is operable to over-ride the non-activation command in response to a payment of a fee, the over-ride being operable to initiate or continue active operation of the engine of the vehicle.

9. A vehicle ignition control system, the system comprising:
a processor;
a memory in data communication with the processor;
a number of vehicle sensors in data communication with the processor, the number of vehicle sensors operable to generate sensor data and the processor operable to store the sensor data in the memory, the sensor data indicating conditions of the vehicle during operation;

a transmitter in data communication with the processor, the transmitter operable to transmit data to an external device;

a receiver in data communication with the processor, the receiver operable to receive external data from the external device, the processor further operable to store the external data in the memory, the external data comprising a set of vehicle operating requirements; and an engine control unit in communication with the processor, the engine control unit operable to control the activation and operation of the engine of the vehicle, wherein the processor is further operable to analyze the received external data and the stored sensor data, and wherein the engine control unit is configured to prevent or discontinue active engine operation in response to the stored sensor data indicating that the vehicle does not comply with the vehicle operating requirements, wherein the set of vehicle operating requirements define a set of acceptable operating parameters including at least one of velocity, stoichiometry, tachometry, and vehicle emissions.

10. The vehicle ignition control system of claim 9, wherein the sensor data further comprises location data corresponding to the location of the vehicle, and wherein the received external data further comprises location data corresponding to enforcement zones of the vehicle operating requirements.

11. The vehicle ignition control system of claim 9, wherein the processor is embodied within a mobile device, the mobile device being in wireless data communication with the number of vehicle sensors, the transmitter, the receiver, and the engine control unit.

12. The vehicle ignition control system of claim 11, wherein the mobile device comprises a smart phone.

13. The vehicle ignition control system of claim 11, wherein the mobile device comprises a tablet computing device.

14. The vehicle ignition control system of claim 1, wherein the processor is further operable to request external data from the external device and analyze the received external data to stored sensor already stored in the memory in response to an engine ignition control signal.

15. The vehicle ignition control system of claim 9, further comprising a fund transaction unit in data communication with the processor, the fund transaction unit operable to initiate monetary transactions between a first bank account associated with a user of the vehicle and a second bank account associated with a second party.

16. The vehicle ignition control system of claim 15, wherein the processor may over-ride a command to prevent or discontinue active engine operation in response to an initiation of a monetary transaction between the first bank account and the second bank account by the fund transaction unit.

17. A method of operational activity of a vehicle having a network interface in data communication with a number of network data sources, a number of sensors, and a number of electronic control units including an engine control unit, the method comprising:
monitoring functional behavior of the vehicle using the sensors and the electronic control units during active vehicle operation;
generating operational data corresponding to the data provided by the sensors and the electronic control units during the active vehicle operation;

receiving driving restriction data from a network data source providing driving restriction data via the network interface, the restriction data defining a set of operating parameters including at least one of velocity, stoichiometry, tachometry, and vehicle emissions;

adjusting the behavior of the vehicle using the number of electronic control units to conform to the operating parameters when the operational data indicates that the vehicle does not operate within the operating parameters.

18. The method of claim 17, the wherein the generating the operational data further comprises storing the operational data in a data store prior to the end of the active vehicle operation.

19. The method of claim 18, wherein the receiving driving restriction data from a network data source further comprises requesting the driving restriction data from the network data source providing driving restriction data via the network interface when the engine of the vehicle is initiated into an active operation mode after a period of inactivity.

20. The method of claim 19, wherein the adjusting the behavior of the vehicle using the number of electronic control units comprises de-activating the engine of the vehicle.

* * * * *